United States Patent
Breu

(10) Patent No.: US 10,667,234 B2
(45) Date of Patent: May 26, 2020

(54) METHOD AND DEVICE FOR TRANSFERRING DATA

(71) Applicant: DAIMLER AG, Stuttgart (DE)

(72) Inventor: Jakob Breu, Berlin (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/308,259

(22) PCT Filed: May 18, 2017

(86) PCT No.: PCT/EP2017/000600
§ 371 (c)(1),
(2) Date: Dec. 7, 2018

(87) PCT Pub. No.: WO2017/211441
PCT Pub. Date: Dec. 14, 2017

(65) Prior Publication Data
US 2019/0268871 A1 Aug. 29, 2019

(30) Foreign Application Priority Data
Jun. 9, 2016 (DE) ........................ 10 2016 007 004

(51) Int. Cl.
*H04W 48/18* (2009.01)
*H04W 60/00* (2009.01)
(Continued)

(52) U.S. Cl.
CPC ........... *H04W 64/00* (2013.01); *H04W 48/18* (2013.01); *H04W 4/44* (2018.02); *H04W 88/06* (2013.01)

(58) Field of Classification Search
CPC ....... H04W 64/00; H04W 88/06; H04W 4/44; H04W 48/18; H04W 84/005;
(Continued)

(56) References Cited

U.S. PATENT DOCUMENTS

| 8,451,786 B2 | 5/2013 | Stählin et al. |
| 8,892,041 B2 | 11/2014 | Gansen et al. |

(Continued)

FOREIGN PATENT DOCUMENTS

| DE | 102008037880 A1 | 3/2009 |
| DE | 102011113300 B3 | 6/2012 |

(Continued)

OTHER PUBLICATIONS

International Search Report dated Jul. 25, 2017 in corresponding/related International Application No. PCT/EP2017/000600.

(Continued)

*Primary Examiner* — Dong-Chang Shiue
(74) *Attorney, Agent, or Firm* — Patent Portfolio Builders PLLC

(57) ABSTRACT

A method for data transmission in which data is emitted and/or received by a communication device in a first radio network formed according to a first standard in a first operating mode and data is emitted and/or received in a second radio network formed according to a second standard in a second operating mode. The communication device detects whether it is inside or outside a receiving region of the first radio network. The communication device is operated in the first operating mode if it is inside the receiving region of the first radio network, and the communication device is operated in the second operating mode if it is outside the receiving region of the first radio network. The second standard is an IEEE 802.11p standard and the first standard is a standard of the IEEE 802.11 regulation that is different from the IEEE 802.11p standard. The communication device takes part in an ad-hoc communication in the second operating mode.

9 Claims, 2 Drawing Sheets

Figure 1:
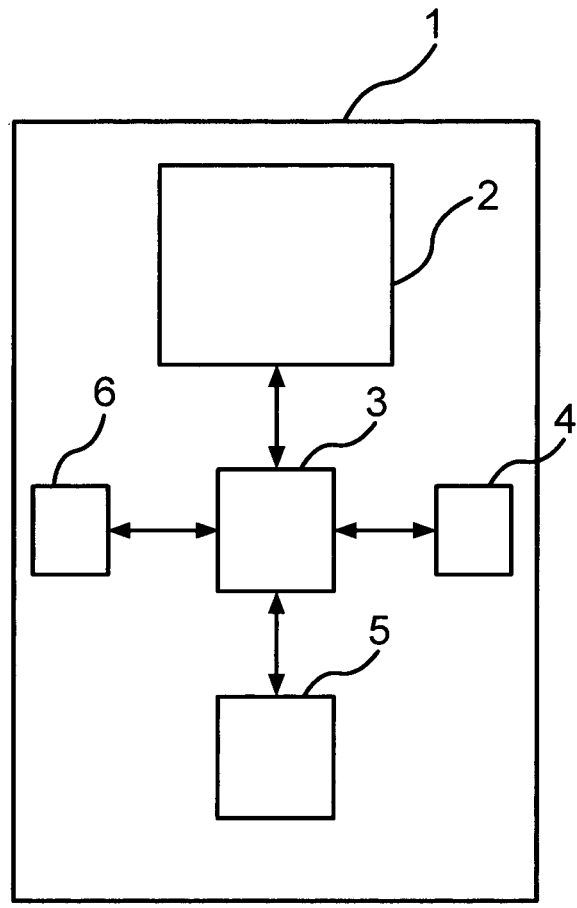

(51) Int. Cl.
   *H04W 88/06* (2009.01)
   *H04W 64/00* (2009.01)
   *H04W 4/44* (2018.01)

(58) Field of Classification Search
   CPC ..... H04W 48/04; H04W 24/02; H04W 36/14; H04W 36/30; H04W 36/32
   See application file for complete search history.

(56) References Cited

U.S. PATENT DOCUMENTS

| | | | |
|---|---|---|---|
| 2009/0278705 A1 | 11/2009 | Chhabra et al. | |
| 2010/0056181 A1* | 3/2010 | Rippon | H04W 8/22 455/456.3 |
| 2013/0279491 A1* | 10/2013 | Rubin | G08G 1/166 370/347 |
| 2015/0296411 A1* | 10/2015 | Meyer | G08G 1/0112 370/336 |
| 2016/0150451 A1* | 5/2016 | Barreto De Miranda Sargento | H04W 36/14 370/332 |
| 2016/0345341 A1* | 11/2016 | Oliver | H04W 4/029 |
| 2017/0164274 A1 | 6/2017 | Petrescu et al. | |
| 2018/0199174 A1* | 7/2018 | Gozalvez-Serrano | H04W 72/121 |
| 2019/0132867 A1* | 5/2019 | Karapantelakis | H04W 74/04 |

FOREIGN PATENT DOCUMENTS

| | | | |
|---|---|---|---|
| DE | 102011118966 A1 | 5/2013 | |
| EP | 1772994 A1 * | 4/2007 | ............ H04W 88/06 |
| EP | 1772994 A1 | 4/2007 | |
| FR | 3023668 A1 | 1/2016 | |

OTHER PUBLICATIONS

Written Opinion dated Jul. 25, 2017 in corresponding/related International Application No. PCT/EP2017/000600.

* cited by examiner

METHOD AND DEVICE FOR TRANSFERRING DATA

BACKGROUND AND SUMMARY OF THE INVENTION

Exemplary embodiments of the present invention relate to a method for data transmission, in which data are emitted and/or received in a first radio network formed according to a first standard by means of a communication device in a first operating mode and data are emitted and/or received in a second radio network formed according to a second standard in a second operating mode, wherein it is detected by means of the communication device whether the communication device is inside or outside a receiving region of the first radio network. Furthermore, the present invention relates to a device for data transmission.

Methods for data transmission are known from the prior art in which data in local radio networks are emitted and/or received. Such a local radio network can be a wireless local network (WLAN—Wireless Local Area Network), for example. In particular, such wireless local networks can be formed according to the IEEE 802.11 standard which, in turn, comprises different regulations. Here, the IEEE 802.11p standard is used for the ad-hoc communication for traffic participants. This communication includes the data exchange between cars or traffic participants, which is also known as car-to-car communication. Furthermore, this standard is also used for the communication between cars and infrastructure devices, which is also referred to as car-to-infrastructure communication. In the IEEE 802.11p standard, communication takes place on a decided frequency spectrum at 5.9 GHz. The conventional WLAN communication for consumers according to other IEEE 802.11 standards uses other frequencies and channel access methods.

Furthermore, communication devices are known from the prior art which emit and/or receive data in a first radio network in a first operating mode, the radio network being formed according to a first standard, and which emit and/or receive data in a radio network in a second operating mode, the radio network being formed according to a second standard. The communication devices support the operation in both kinds of radio networks but not in parallel operation. An operating mode can be selected depending on the use of the communication devices.

To do so, German patent document DE 10 2008 037 880 A1 describes a device for transmission of information in a car-to-car communication based on WLAN according to the IEEE 802.11 standard, in which communication both safety information according to the IEEE 802.11p standard and information that is not relevant to safety according to a different IEEE 802.11 standard is transmitted. The device has a WLAN chipset which, in turn, has a sending and/or receiving device. The WLAN chipset can be switched between a first mode according to the IEEE 802.11p standard and a second mode according to a different IEEE 802.11 standard by means of a control command.

Furthermore, German patent document DE 10 2011 113 300 B3 describes a mediation device for coupling to an antenna unit and a computing unit for forming a communication device as part of the motor vehicle-to-X communication, wherein the mediation device has at least one interface for communication with a mobile terminal comprising a computing unit, in particular a mobile telephone, and a control device for forwarding at least one part of received messages to the mobile terminal and/or for emitting messages based on a control command from the mobile terminal.

Additionally, United States patent document US 2009/0278705 A1 describes a method for providing WiFi access for a portable device. Here, an initial position of the portable device is determined and transmitted to a location provider. In addition, locations and WiFi parameters for a set of WiFi access points are received by the location provider, wherein the set of WiFi access points lies inside a radius of the initial position of the portable device. Moreover, it is checked whether the portable device is in a wireless region of at least one of the WiFi access points. Furthermore, a transceiver of the portable device can be activated if the portable device is in the wireless region of at least one of the WiFi access points. Here, the connection between the portable device and the location provider or a base station takes place via a mobile radio connection.

Furthermore, German patent document DE 10 2011 118 966 A1 discloses a communication device for a traffic participant, in particular for a car or a pedestrian, for avoiding collisions between the traffic participant and another traffic participant, wherein the communication device is formed for the wireless emission and/or reception of data. Here, the communication device can communicate according to the WLAN communication standard.

Exemplary embodiments of the present invention are directed to a solution as to how a communication device which can be operated in two different radio networks can be used more efficiently.

A method according to the invention serves for data transmission. Data in a first radio network formed according to a first standard are emitted and/or received by means of a communication device in a first operating mode and data in a second radio network formed according to a second standard are emitted and/or received in a second operating mode, wherein it is detected by means of the communication device whether the communication device is inside or outside a receiving region of the first radio network. The communication device is operated in the first operating mode if the communication device is inside the receiving region of the first radio network, and the communication device is operated in the second operating mode if the communication device is outside the receiving region of the first radio network. Here, the second standard is an IEEE 802.11p standard and the first standard is a standard of the IEEE 802.11 regulation that is different from the IEEE 802.11p standard. In addition, the communication device takes part in an ad-hoc communication in the second operating mode.

The method can be carried out by a corresponding device, in particular a mobile terminal. This device can have a communication device that is formed, for example, by a communication chip or a WLAN chipset. This communication device can emit and/or receive data in the first radio network in the first operating mode. In the second operating mode, the communication device can emit and/or receive data in a second radio network different from the first radio network. The first radio network and the second radio network are each, in particular, a wireless local network, which can also be referred to as WLAN. The communication device is further formed to be able to recognize whether the communication device is inside or outside the receiving region of the first radio network. The first radio network can comprise, for example, a wireless router or a so-called wireless access point, by which the receiving region of the first radio network is defined. This router can emit corresponding data packets in predefined time intervals, the data packets describing the name of the first radio network. These data packets can also be referred to as service set identifiers (SSID). When these data packets are received by the communication device, the communication device is in the receiving region of the first radio network.

According to an essential aspect of the invention, the communication device is operated in the first operating mode if the communication device is inside the receiving region of the first radio network, and the communication device is operated in the second operating mode if the communication device is outside the receiving region of the first radio network. When the communication device is inside the receiving region of the first radio network, the data in the first radio network can be emitted and/or received by the communication device. Thus, as soon as the communication device is in the receiving region of the first radio network, the communication device can be operated in the first operating mode. Yet if the communication device is outside the receiving region of the first region network, the communication device can be operated in the second operating mode and emit and/or receive data in the second radio network. In the second operating mode, the communication device takes part in an ad-hoc communication. Thus, the communication device can also be used for data exchange when it is outside the receiving region of the first radio network. Overall, this enables a more efficient operation of the communication device.

In addition, the second standard is an IEEE 802.11p standard and the first standard is a standard of the IEEE 802.11 regulation that is different from the IEEE 802.11p standard. The first radio network can, for example, be formed according to the IEEE 802.11a standard, the IEEE 802.11b standard, the IEEE 802.11c standard, the IEEE 802.11d standard, the IEEE 802.11e standard, the IEEE 802.11f standard, the IEEE 802.11g standard, the IEEE 802.11h standard, the IEEE 802.11i standard, the IEEE 802.11j standard, the IEEE 802.11n standard, the IEEE 802.11ac standard, the IEEE 802.11ad standard or the IEEE 802.11ah standard. In the first radio network, the data can be transmitted, for example, in a frequency band of 2.4 GHZ or in a frequency band between 5.1 and 5.8 GHz. In the second radio network, the data can be transmitted in a frequency band of 5.9 GHz. In other words, the first radio network represents a WLAN that is commonly used. This first radio network can be used, for example, in a residential home in which a WLAN access point is present. The first radio network can also be used, for example, in a workplace of a user of the device or the mobile terminal in which free internet access, for example, is available to the user as the employer via WLAN. Furthermore, the first radio network can be used in so-called hotspots, which are available at cafés or shops, for example. The communication device can thus be used in various first radio networks. Outside these WLAN access points or outside the receiving region of the first radio network, the second radio network is then used, which is operated according to the IEEE 802.11p standard. In this second radio network, data can then also be emitted and/or received by the mobile terminal.

According to a further embodiment, a position of the communication device is determined, and the determined position is stored in a storage device if the communication device is in the receiving region of the first radio network. The device or the mobile terminal can have a position determination device, for example, by means of which the current position of the mobile terminal and thus also the communication device can be determined. For example, the current position can be determined by means of the position determination device on the basis of a satellite-supported position determination system. Furthermore, the current position of the communication device can take place via a corresponding positioning in a mobile radio network. When it is detected that the communication device is in the detection region of the first radio network or when the communication device is dialed into the first radio network, the current position of the mobile terminal or the communication device can be stored in a storage device. Position values, in particular, which describe the current position, can be stored in the storage device. Thus, the respective position values can be stored in the storage device, in which the communication device is in the receiving region of the first radio network. This data set can be automatically managed and updated in the background. Thus, the mobile terminal can effectively learn the areas in which the first radio network is available.

According to a further embodiment, a current position of the communication device is compared to positions stored in the storage device, and the communication device is operated in the second operating mode if the current position differs from the stored positions. In particular, the communication device is operated in the second operating mode if the current position differs from all positions stored in the storage device. When the communication device is thus outside the receiving region of the first network, the communication device is automatically switched into the second operating mode. Conversely, as soon as the mobile terminal or the communication device is inside the receiving region of the first radio network or inside a known WLAN surrounding area, the communication device automatically switches into the first operating mode. This leads to the WLAN access being able to be used by the mobile terminal if the communication device is in the receiving region of a known first radio network for which a user of the mobile terminal has registered, for example. Outside the receiving regions of the first radio network in which the communication device would otherwise usually be in an idle state or in a standby mode, the mobile terminal can be used to communicate with cars or traffic participants or infrastructure devices.

Furthermore, it is advantageous when, in the second operating mode, the data is sent by the communication device to a further communication device of a further traffic participant and/or to a further communication device of an infrastructure device. When the communication device is operated in the second operating mode, the communication device can emit data to a communication device of a further traffic participant, for example to a car. Furthermore, data can be emitted to a communication device of an infrastructure device by the communication device. Such an infrastructure device can be, for example, a light signal installation or a traffic control center. The communication device can thus be used as an emitter in the second radio network. This enables other traffic participants and infrastructure devices to receive information from the communication device or the mobile terminal when this is in the second operating mode. The received data can be, for example, data or traffic information that is relevant to safety.

Preferably, data describing a current position of the communication device and/or a current movement of the communication device and/or a current point in time, are sent to the further communication device of the traffic participant and/or the further communication device of the infrastructure device by means of the communication device. The data emitted by the mobile terminal or the communication device can describe the current position of the mobile terminal or the communication device. The current position of the communication device can—as described above—be determined with the aid of the position determination device of the mobile terminal. Thus, a piece of information is presented to the at least one further traffic participant and/or the infrastructure device about where the mobile terminal is. Furthermore, the data emitted by the communication device in the second operating mode describe a current position of the communication device or the mobile terminal. Thus, a piece of information about the current movement direction is presented to the further traffic participants and/or the infrastructure device. The data can also describe a current speed and/or acceleration of the communication device. The data that are emitted by the communication device in the second operating mode can also describe a current point in time. In other words, the data can comprise a corresponding time stamp. Thus, it can be determined on the basis of the data when the mobile terminal was in which position. When the traffic participant is a car, a driver assistance system of the car, for example, can determine on the basis on the data that is emitted by the mobile terminal whether the mobile terminal or a user carrying the mobile terminal is in a lane, and thus, if appropriate, if there is also the threat of a collision. Thus, there is the possibility that the driver assistance system of the car introduces corresponding collision-avoiding measures. Thus, road traffic safety is also increased for users of the mobile terminal.

According to a further embodiment, the data are received from the further communication device of the traffic participant and/or the infrastructure device by means of the communication device in the second operating mode. In other words, the communication device of the mobile terminal can be operated in the second operating mode as a receiver and receive data from further traffic participants or infrastructure devices. In this way, data that are otherwise only transmitted via car-to-car communication or via car-to-infrastructure communication are available to a user of the mobile terminal. Thus, the user of the mobile terminal can receive data that indicate, for example, possible dangers in the road traffic. Furthermore, data describing the current traffic situation or weather conditions in the surrounding area are available to the user of the mobile terminal. Thus, users of the mobile terminal who participate in road traffic as pedestrians, cyclists, motor cyclists or similar can also use the advantages of the car-to-car communication and the car-to-infrastructure communication.

In a further embodiment, data emitted from the further communication device of the traffic participant describing an operating state of the further traffic participant and/or data emitted by the further communication device of the infrastructure device describing an operating state of the infrastructure device are received by means of the communication device. As already explained, the further traffic participant can be a car, in particular a motor vehicle. The data emitted from the traffic participant by its further communication device can describe the current position, the current speed, the current longitudinal acceleration, the current lateral acceleration, a current rate of rotation and/or a current steering angle as the operating state. Furthermore, the data can describe information relating to a driver assistance system of the traffic participant or the car as the operating state. For example, the data can describe that a driver assistance system of the further traffic participant has been triggered or activated. Such a driver assistance system can be, for example, an anti-blocking system, an emergency brake assistant or similar. Thus, possible dangerous situations can be indicated to the user of the mobile terminal. Furthermore, the data provided by the traffic participant can describe information related to a traffic situation in the surrounding area of the traffic participant. The data can comprise, for example, information relating to traffic jams, broken-down cars, building sites, a deployment of rescue vehicles or similar. Furthermore, the data that are emitted from the further traffic participant can describe information relating to weather conditions in the surrounding area of the further traffic participant. In this case, the data can describe, for example, whether it is raining or snowing in the surrounding area of the traffic participant or whether there is a risk of aquaplaning and/or whether black ice is present.

In addition, the communication device of the mobile terminal can receive data from an infrastructure device. The infrastructure device can be a light signal installation, for example, in particular a traffic light. In this case, as the operating state, the data can describe how long a red phase of the traffic light remains. Furthermore, the infrastructure device can be, for example, a traffic control system, which provides information relating to the current traffic situation and/or the weather conditions as the data. As a result of the receipt of the data, it is possible for the user of the mobile terminal to increase the safety in road traffic, on the one hand, and improve the traffic efficiency of the movement in road traffic, on the other hand.

Furthermore, it is advantageous when an output and/or warning is emitted depending on the data received in the second operating mode. The device or the mobile terminal can comprise a corresponding output device with which an output and/or a warning can be emitted. For example, an optic, acoustic and/or haptic warning can be emitted. With the aid of the computing device of the mobile terminal, the output device can be controlled on the basis of the received data in such a way that information relating to the data or corresponding warnings can be emitted to the user of the mobile terminal.

A device according to the invention for data transmission is formed, in particular, as a mobile terminal. The device can be, for example, a smartphone, a portable computer or a tablet. The device comprises a communication device that is configured to send and/or receive data in a first radio network formed according to a first standard in a first operating mode and, to send and/or receive data in a second radio network formed according to a second standard in a second operating mode, wherein the device is configured to recognize whether the communication device is inside or outside a receiving region of the first mobile network. Furthermore, the device comprises a computing device for adjusting the operating mode of the communication device. Here, the computing device is configured to operate the communication device in the first operating mode if the communication device is inside the receiving region of the first radio network, and to operate the communication device in the second operating mode if the communication device is outside the receiving region of the first radio network. Here, the second standard is an IEEE 802.11p standard and the first standard is a standard of the IEEE 802.11 regulation that is different from the IEEE 802.11p standard. In addition, the communication device is configured to take part in an ad-hoc communication in the second operating mode.

The computing device can be, for example, a programmable computer, such as a digital signal processor, a microcontroller or similar. The communication device can be a corresponding WLAN chip that can be operated both in the first operating mode and in the second operating mode. Furthermore, the device can have a storage device that can be formed, for example, as a RAM, as a ROM or as a flash storage. Furthermore, the device can comprise a position determination device for determining the position of the device or the communication device.

Thus, users of the device who take part in road traffic can also use the car-to-car communication and/or the car-to-infrastructure communication. This is suitable for pedestrians, cyclists or drivers of motorcycles, in particular. Furthermore, the device or the mobile terminal is used in a motor vehicle, in particular a passenger motor vehicle. Thus, information relating to data relevant to traffic can also be available in a vehicle which does not have a communication device for vehicle-to-vehicle communication and/or vehicle-to-infrastructure communication itself. Here, it can be considered that the sending and/or receiving range of the device can be limited when the device is inside the motor vehicle.

A further aspect of the invention relates to a computer program saved on the storage device of the device, for example. Here, the computer program is programmed to carry out a method according to the invention or advantageous embodiments of the method when it is run on the computing device. Thus, a smartphone or a tablet, for example, on which the computer program is present can carry out the method according to the invention. Thus, the method can be possible on a known mobile terminal by means of a software update. Here, it can also be provided that the computer program is provided as an application.

The preferred embodiments presented with relation to the method according to the invention and advantages thereof correspondingly apply to the device according to the invention and the computer program according to the invention.

Further advantages, features and details of the invention arise from the description of a preferred exemplary embodiment below, as well as with the aid of the figure. The features and combinations of features specified above in the description and the features and combinations of features specified in the description of the figures and/or in the figures only below can be used not only in the combination specified in each case, but also in other combinations or on their own without exceeding the scope of the invention.

BRIEF DESCRIPTION OF THE DRAWING FIGURES

The invention is now explained in more detail in connection with exemplary embodiments with reference to the attached drawings.

Figure 2:
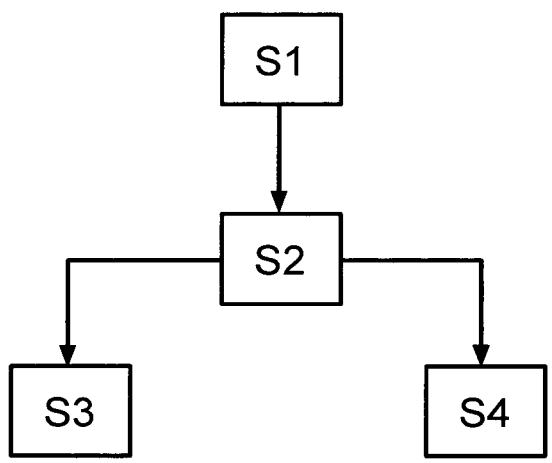
Figure 3:
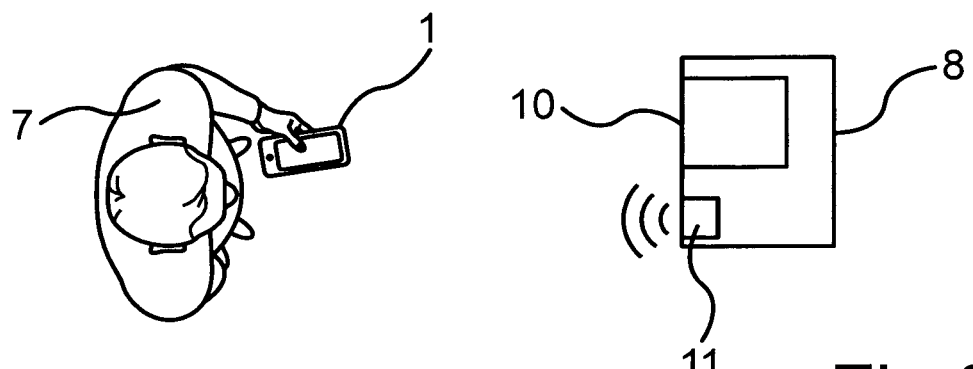
Figure 4:
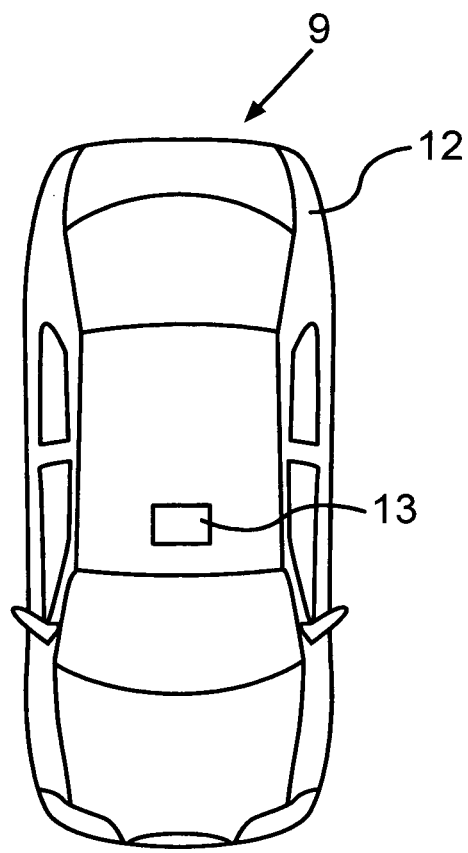
Figure 4:
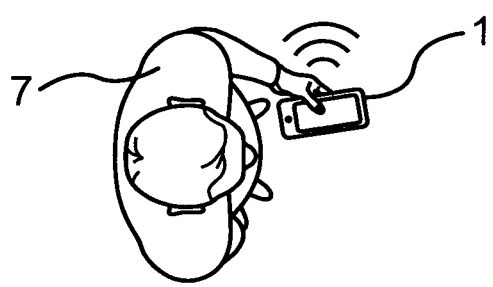

Here are shown:

FIG. 1 a device for data transmission in a schematic depiction;

FIG. 2 a schematic flow chart of a method for data transmission;

FIG. 3 a user with the device that communicates with an infrastructure device; and FIG. 4 a user with the device that communicates with a car.

In the figures, the same and functionally identical elements are provided with the same reference numerals.

DETAILED DESCRIPTION

FIG. 1 shows a device 1 in a schematic depiction. The device 1 can be, in particular, a mobile terminal, which can be formed, for example, as a mobile telephone, as a smartphone, as a tablet or as a portable computer. The device 1 comprises a communication device 2, which can be a WLAN communication chip, for example. The communication device 2 can be operated in a first and in a second operating mode. In the first operating mode, the communication device 2 can send and/or receive data in a first radio network. In the second operating mode, the communication device 2 can send and/or receive data in a second radio network.

Here, the second radio network is formed according to a second standard, namely the IEEE 802.11p standard. The first radio network is formed according to a first standard, which is a standard of the IEEE 802.11 regulation, which is different from the IEEE 802.11p standard. In the first operating mode, the communication device 2 can thus emit and/or receive data in commonly used local data networks or WLAN networks. These first radio networks can be provided, for example, to a user 7 of the device 1 in his place of residence, in his workplace or so-called hotspots. In the second operating mode, the communication device 2—as explained in more detail below—can receive data from a traffic participant 9 or an infrastructure device 8.

The device 1 further comprises a computing device 3, which can be a digital signal processor, a microprocessor or similar, for example. With the aid of the computing device 3, the communication device 2 can be controlled and thus operated in the first operating mode or the second operating mode. With the aid of the computing device 3, the operating mode of the communication device 2 can thus be adjusted. Furthermore, the device 1 comprises a position determination device 4 by means of which the current position of the device 1 or the communication device 2 can be determined. The position determination device 4 can be, for example, a receiver for a satellite-supported position determination system. Furthermore, the device 1 comprises a storage device 5 in which data or programs can be stored. Finally, the device 1 comprises an output device 6 by means of which an output can be emitted to the user 7.

FIG. 2 shows a schematic flow chart of a method for data transmission, which is carried out by the device 1. In order to carry out the method, a corresponding computer program can be stored on the storage device 5, the computer program being run on the computing device 3. The method is beings in step S1. In a step S2, it is checked whether the communication device 2 or the device 1 is in a receiving region of the first radio network. To do so, data packets corresponding to the communication device 2, for example, can be received that are emitted from an access point of the first radio network.

If the communication device 2 or the device 1 is in the first radio network, the method proceeds with step S3. Here, the communication device 2 is operated in the first operating mode. For this purpose, the communication device 2 is correspondingly controlled by means of the computing device 3 and thus transferred in the first operating mode. In addition, the current position of the device 1 or the communication device 2 can be determined by the position determination device 4. The current position is determined by the position determination device 4 and transferred to the computing device 3. The computing device 3 can then save a corresponding value describing the current position of the device 1 on the storage device 5. Thus, at a later point in time, the current position determined by the position detection device 4 can be compared to positions that are saved in the storage device 5. Since the positions stored in the storage device 5 only describe such positions that are in a receiving region of a first network, it can thus be determined in a simple manner whether the device 1 is in a receiving region of a known first radio network.

If the monitoring in step S2 shows that the device 1 is outside the receiving region of a first radio network, the method proceeds with a step S4. Here, the communication device 2 is operated in the second operating mode. The communication device 2 can establish an ad-hoc communication with traffic participants 9 and/or infrastructure devices 8 and communicate with these via the IEEE 802.11p standard. In the second operating mode, the device 1 or the communication device 2 can emit data to traffic participants 9 or infrastructure devices 8. These data can comprise, for example, the current position of the device 1, a current speed of the device 1 and/or the current point in time or time stamp. In addition, the communication device 2 can receive data from further traffic participants 9 or infrastructure devices 8 in the second operating mode. On the basis of these received data, a corresponding output or a warning can be provided to a user 7 of the device 1 with the aid of the output device 6.

When the user 7 of the device 1 or the mobile terminal is in road traffic, the device 1 is usually outside the receiving region of the first radio network. In this situation, the communication device 2 is now used to communicate with traffic participants 9 and/or infrastructure devices 8 via the IEEE 802.11p standard. Thus, it is possible, for example, that further traffic participants 9 are warned before the user 7. Furthermore, information is provided to the user 7 by the data received by the device 1 by means of which information road traffic safety can be increased. Two situations are described below in FIGS. 3 and 4 by way of example as to how the device 1 can be used in road traffic.

FIG. 3 shows a first exemplary situation in which the user 7, presently a pedestrian, is holding or operating the device 1. An infrastructure device 8 is in the surrounding area of the user 7. Presently, the infrastructure device 8 is a light signal assembly or a traffic light. The infrastructure device 8 comprises a display unit 10 by means of which the light signals of the traffic light can be provided. Furthermore, the infrastructure device 8 comprises a further communication device 11 by means of which data can be transferred without cables to the communication device 2 of the device 1. On the basis of the received data, a corresponding display can then be provided by the output device 6. For example, a display can be provided on the output device 6 that states how long a red phase of the traffic light there is still remaining.

FIG. 4 shows a further situation in which the user 7 who is holding or operating the device 1 is in a surrounding area of a further traffic participant 9 or a car 12. Presently, data can be wirelessly transferred to a further communication device 13 of the car 12 by the communication device 2 of the device 1, the data describing the current position of the device 1. In this way, information can be provided to the driver of the car 12 as to which location the user 7 with the device 1 is in. When the user 7 is, for example, on a lane in the travelling direction in front of the vehicle 12, a warning based on the data received by the device 1 can be emitted to the driver of the car 12. Thus, a possible collision between the driver 1 and the user 7 can be prevented, for example. This can be advantageously used, for example, when the user 7 is a child who is using their smartphone as the device 1 on which a corresponding computer program is run in order to carry out the method.

As a result of the device 1, by means of which the method for data transmission is carried out, the safety and the traffic efficiency in road traffic can also be increased for pedestrians who also use the device 1. In the same way, the device 1 can also be used, for example, by a cyclist. The device 1 can also be used on a motorized vehicle. Here, in principle, the same functionality can be provided by the device 1. Thus, for example in cars, in particular motor vehicles that do not themselves have a communication device for data exchange according to IEEE 802.11p standard, the opportunity is presented to participate in car-to-car communication or in car-to-infrastructure communication.

The communication device 2 takes part in an ad-hoc communication in the second operating mode. This ad-hoc communication takes place with traffic participants 9 and/or infrastructure devices 8 via the IEEE 802.11p standard. An ad-hoc network is thus established between the communication device 2 and at least one further traffic participant 9 and/or at least one infrastructure device 8. An ad-hoc network is a closed network that can organize itself and has no hierarchy. This ad-hoc network is established, in particular, only for the duration of the communication. Furthermore, the ad-hoc network cannot have a set communication structure. Preferably, the communication partners that are coupled to the ad-hoc network are dynamically integrated into the communication net. As a result of the ad-hoc communication, the data relevant to safety can be transferred between the communication device 2 on the one hand and the traffic participants 9 and/or the infrastructure devices 8 on the other hand in a short amount of time, whereby the safety can be increased.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for data transmission, the method comprising:
   determining, by a communication device, whether the communication device is inside or outside a receiving region of a first radio network that operates according to a first standard;
   automatically switching the communication device to operate in a first operating mode responsive to the determination that the communication device is inside the receiving region of the first radio network, wherein in the first operating mode data are transmitted and/or received with the first radio network according to the first standard;
   automatically switching the communication device to operate in a second operating mode responsive to the determination that the communication device is outside the receiving region of the first radio network, wherein in the second operating mode data are transmitted and/or received with a second radio network according to a second standard;
   receiving, by the communication device in the second operating mode from a further communication device of a traffic participant and/or a further communication device of an infrastructure device, safety-relevant data indicating possible dangers in road traffic; and emitting an output and/or warning depending on the safety-relevant data indicating possible dangers in the road traffic received in the second operating mode from the further communication device of the traffic participant and/or from the further communication device of the infrastructure device, wherein the emitted output and/or warning indicates possible dangerous situations, wherein the second standard is an IEEE 802.11p standard and the first standard is a standard of the IEEE 802.11 regulation that differs from the IEEE 802.11p standard, and wherein the communication device takes part in an ad-hoc communication in the second operating mode, wherein the method further comprises determining a position of the communication device and storing the determined in a storage device responsive to the communication device being in the receiving region of the first radio network;

comparing a current position of the communication device to positions stored in the storage device; and operating the communication device in the second operating mode responsive to the current position differing from the stored positions.

2. The method of claim 1, wherein in the second operating mode, data are sent from the communication device to the further communication device of the traffic participant and/or to the further communication device of the infrastructure device.

3. The method of claim 2, further comprising:

transmitting, by the communication device, data describing a current position of the communication device, a current movement of the communication device, and/or a current point in time to the further communication device of the traffic participant and/or to the further communication device of the infrastructure device.

4. The method of claim 1, wherein the safety-related data indicating possible dangers in the road traffic received from the further communication device of the traffic participant describes operating state of the traffic participant, and/or the further communication device of the infrastructure device describes an operating state of the infrastructure device.

5. The method of claim 1, wherein the infrastructure device is a traffic light.

6. The method of claim 5, wherein the safety-relevant data includes a current traffic situation and/or weather conditions.

7. The method of claim 1, wherein the communication device is carried by a pedestrian or cyclist.

8. The method of claim 7, wherein the communication device is a smartphone or tablet.

9. A mobile terminal, comprising:

a communication device configured to send and/or receive data in a first network operating according to a first standard in a first operating mode, and to send and/or receive data in a second radio network operating according to a second standard in a second operating mode, wherein mobile terminal is configured to determine whether the mobile terminal is inside or outside a receiving region of the first radio network;

automatically switching the communication device to operate in the first operating mode responsive to the determination that the mobile terminal is inside the receiving region of the first radio network;

automatically switching the communication device to operate in the second operating mode responsive to the determination that the mobile terminal is outside the receiving region of the first radio network;

receive, by the communication device in the second operating mode from a further communication device of a traffic participant and/or a further communication device of an infrastructure device, safety-relevant data indicating possible dangers in road traffic; and emit an output and/or warning depending on the safety-relevant data indicating possible dangers in the road traffic received in the second operating mode from the further communication device of the traffic participant and/or from the further communication device of the infrastructure device, wherein the emitted output and/or warning indicates possible dangerous situations, wherein the second standard is an IEEE 802.11p standard and the first standard is a standard of the IEEE 802.11 regulation that differs from the IEEE 802.11p standard, and wherein the communication device takes part in an ad-hoc communication in the second operating mode, wherein the mobile terminal is further configured to determine a position of the communication device and storing the determined in a storage device responsive to the communication device being in the receiving region of the first radio network;

compare a current position of the communication device to positions stored in the storage device; and operate the communication device in the second operating mode responsive to the current position differing from the stored positions.

* * * * *